2,773,082
Patented Dec. 4, 1956

2,773,082

TREATMENT OF RAW MATERIALS CONTAINING FATTY MATERIALS

Israel Harris Chayen, London, England, assignor to British Glues and Chemicals Limited, Garden City, England, a British company No Drawing. Application February 13, 1953, Serial No. 336,887

14 Claims. (Cl. 260—412)

This invention relates to the treatment of raw materials containing fatty materials and, more particularly, to a process in which pieces of said raw material are subjected to intense impacts while surrounded by or suspended in a liquid in which all or at least part of the residue of the raw material after separation of the fatty material is less soluble than in water.

In my copending application Serial No. 237,327, filed July 18, 1951, now Patent Number 2,635,104, dated April 14, 1953, I have disclosed a process for recovering fat from materials containing the same in which pieces of such materials are subjected to intense impacts such as a highspeed series of impacts from the hammers of a hammer mill while such pieces of material are surrounded by or suspended in an amount of water which is several times the weight of the material being treated such that the impacts are wholly or partly delivered through the water. When treating many types of fat-containing material, for example, bones or soft fat products from most land animals, the impact treatment in the presence of water produces a mixture from which a material high in fat content can be separated by difference in specific gravity from most of the water and from a residual material most of which is insoluble in or does not remain suspended in the water so as to leave very little fat in the water or residual material and also not more than a small proportion of the residual material in solution or suspension in the water. The process disclosed in said copending application is also applicable to raw materials other than bones and soft fat products from land animals, for example, fish and fish livers as well as vegetable raw materials containing fatty materials. With certain fish materials, e. g., herrings, and certain vegetable materials, e. g., olives, some difficulty is experienced with separation, and in these cases a two-stage centrifugal separation is desirably employed as disclosed in my copending application Serial No. 336,888, filed February 13, 1953.

There are, however, certain raw materials containing fatty material which when subjected to intense impacts in the presence of water in accordance with the disclosures of the above-mentioned applications produce mixtures which present certain economic and procedural problems with respect to the recovery of substantially all of the valuable materials. For example, some raw materials produce mixtures in which a substantial amount of desirable components of the residual material, i. e., the portions of the raw material other than the fatty material, is soluble in or remains suspended in the water such that the soluble or suspended material is not easily separated from the water and recovered. Also some raw materials produce mixtures in which the fatty material is present in the form of an oil-in-water emulsion, usually stabilized by residual material in solution or suspension in the water, such that the fatty material cannot be recovered in high yields even by two-stage centrifugal separation, and in some cases the same raw materials produce mixtures presenting both types of separation problems.

In accordance with the present invention, it has been found that the difficulties above discussed may be overcome by employing a liquid other than water in which all or at least part of the residual material is less soluble than in water or which does not result in the formation of a difficultly separable oil-in-water emulsion. Such liquids may be non-aqueous organic liquids, either miscible or immiscible with water, or may be mixtures of water and water-miscible organic liquids or a solution of a water-soluble organic or inorganic solid material in water or other liquid. By employing liquids such as aqueous solutions of salts in which water-soluble proteins are less soluble than in water, it is possible to reduce the losses of such proteins in processes for the recovery of animal fats from bones or animal soft fat products or processes for the recovery of fats from certain fish or fish livers.

The nature of the liquid employed will depend upon the raw material being treated and the fatty material being recovered but, in general, the liquid will be one in which all or at least part of the residual material is substantially insoluble and one in which difficultly separable emulsions having the fat as a disperse phase do not persist. In any event the liquid is selected so that the fatty material and the residual material are readily separated and recovered from a mixture produced by subjecting pieces of the raw material to intense impacts while surrounded by or suspended in such liquid in an amount several times the volume of the pieces being treated.

The process of the present invention is particularly advantageous for recovering oil from oil-bearing seeds such as soyabeans, cottonseed, peanuts, palm kernel nuts and other seeds or nuts similar to those specifically mentioned. Prior processes for recovering oil from such seeds or nuts have included such preliminary steps as dehulling, grinding, cooking, flaking, etc., before any attempt is made to separate the oil from the meal. With some seeds, certain of these steps are omitted, i. e., soyabeans are not usually dehulled, but nearly all oil-bearing seeds or nuts are subjected to at least three preliminary steps, namely, grinding, cooking and flaking, before separation of oil from the meal, whether the separation be by mechanical pressing, i. e., hydraulic pressing or expelling, or by solvent extraction. Grinding is employed to reduce the seeds or nut meats to small size so that the hot water or steam employed in cooking can reach substantially all portions thereof. The cooking is considered necessary to break down or at least soften the cell walls to enable the oil to be pressed from the meal or be reached by an extraction solvent. The flaking operation involves running the solid cooked material between pressure rolls in an attempt to further break down the cell walls and to form it into thin flakes. Such flaking is sometimes omitted where oil separation is by mechanical pressing but is almost universally employed prior to solvent extraction. Even with the expensive preparation referred to above, a considerable portion of the oil is left in the meal in solvent extraction processes even after repeated treatments with the solvent, apparently because such oil is still present in unbroken oil cells and an even larger amount of oil is left in the meal from mechanical pressing operations.

The process of the present invention eliminates any necessity for the preliminary grinding and cooking steps required by the prior art processes. In most cases it also eliminates any necessity for the preliminary dehulling step of the prior art, although in some instances it may be advantageous to employ such a dehulling step where this step is easily carried out without substantial loss of oil-containing material, in order to reduce the amount of solid residual material in the oil recovery process. Reduction of the amount of such solid residual material will usually reduce the amount of oil lost by entrainment therein.

In the present process the oil is directly released from the oil cells by the intense impact treatment in the presence of a liquid. In the case where the oil is insoluble in the liquid employed, the oil can be separated from the liquid and solid residue by differences in specific gravity, and in the case where the oil is soluble in the liquid the resulting solution may be separated from the solid residue by difference in specific gravity, or by filtration in some cases. Where a liquid is employed in which the oil is soluble, the present process becomes a much simpler and more effective solvent extraction process.

The present process is not limited to the recovery of true fats, i. e., liquid or solid tri-glycerides of fatty acids, but is applicable to the recovery of substantially any fat-like material from raw materials containing the same. That is to say, the recovery of such fat-like materials as animal or vegetable waxes including carnauba or candalula wax, or sterols or compounds thereof, such as sterol glycosides or sterol esters, which have the same general physical and solubility properties as true fats, from raw materials containing the same in cells or similar structures, is contemplated by the present invention, the term "fatty material" being employed in the present specification and claims as inclusive of true fats and such fat-like materials as just discussed.

It is therefore an object of the present invention to provide an improved process for recovering fatty materials from raw materials containing the same in which pieces of such raw material are subjected to intense impacts while surrounded by or suspended in a liquid in an amount which is several times the weight of the material being treated and in which at least some of the solid residue of the raw material after removal of the fatty material is less soluble than in water and in which a resultant readily separable mixture is produced and separated to recover a material high in fatty material content and a residual material low in fatty material content.

Other objects and advantages of the invention will appear in the following more detailed description.

In carrying out a preferred embodiment of the invention, pieces of a raw material containing fatty material in cells or cell-like structures are fed into the inlet of a hammer mill of the type in which a plurality of hammers are carried on the periphery of a rapidly rotating rotor. The rotor is enclosed in a casing having a lower portion closed by a grid provided with openings, preferably in the form of slots, of a size preventing passage of the pieces of raw material therethrough until the pieces have been broken into smaller pieces in the mill. The pieces of raw material may be individual fat-containing seeds or portions thereof or may be whole or broken or cut pieces of the meats of larger seeds or pieces of other raw materials containing fatty materials such as the leaves or other parts of certain plants containing vegetable wax in cells or cell-like structures. The pieces of raw material when fed to the mill are directed into the path of the hammers and, in general, are subjected to intense impacts while freely suspended in or surrounded by a liquid which is simultaneously fed into the mill. That is to say, the pieces of raw material are not crushed or pounded between the hammers and surfaces of the casing but are subjected to repeated intense impacts resulting from collisions between relatively stationary pieces of the raw material and the hammers and collisions between the pieces, after high velocities have been imparted thereto by the hammers, and the walls of the casing, which impacts may be wholly or partly delivered to the pieces through the liquid employed.

The peripheral speed of the hammer is, in general, between 2,500 and 30,000 feet per minute. The resulting intense impacts to which the pieces of raw material are thereby subjected and the high relative velocity which is produced between the pieces of raw material and the liquid apparently rupture the fatty material-containing cells of the raw material to release the fatty material and cause it to be scrubbed from the residue of the pieces.

As stated above, water alone is a satisfactory liquid for a large number of raw materials, but in the case of many raw materials a very substantial portion of the desirable components of the residual material is soluble in water or at least is colloidally soluble or remains suspended therein in finely divided form. In such cases, either a large amount of valuable organic material is lost in the water and a major waste disposal problem is presented, or expensive apparatus and additional procedures must be employed to recover such organic material from the water. Also, if water alone is employed as the liquid, a difficulty resolvable emulsion is sometimes present in the mixture discharge from the mill, which emulsion is in some cases stabilized by residual non-fatty material in solution or colloidal solution or suspended in finely divided form in the water.

By employing liquids other than water, including water containing a modifying solute, the difficulties above discussed can be successfully overcome. The exact nature of the liquid employed will vary with the raw material being treated but, in general the liquid should be inert to the raw material, i. e., it should not have any deleterious chemical reactions with any of the constitutents of the raw material and should not be a solvent for any substantial part of the residue of the raw material after removal of the fatty material. The liquid may or may not be a solvent for the fatty material being recovered and should remain in liquid form, i.e., should not solidify or boil at the particular temperature employed in the mill, which temperature will ordinarily be within the range of usual atmospheric temperatures, i. e., from 32° to 100° F. The liquid should have a viscosity of the same order of that of water at the temperature at which it is employed, i.e., it should have a viscosity within the range of approximately ¼ that of water to 4 times that of water on a centipoise scale and should preferably have a viscosity within the range of ½ that of water to 2 times that of water. The liquid should be readily separable from the residual material by such steps as decantation, centrifugal separation or filtration, and with the exception noted hereinafter from the fatty material being recovered by such steps or by evaporation in case the liquid is a solvent for the fatty material.

Examples of liquids which may be employed with various raw materials are liquid hydrocarbons such as hexane or other petroleum fractions, halogenated or other substituted liquid hydrocarbons such as trichloroethylene, or carbon tetrachloride, liquid alcohols such as lower monohydric aliphatic alcohols or liquid glycols including liquid polyalkylene glycols, liquid acetals, esters, ethers, furans, ketones, etc., and even water or other solutions of substantially neutral salts such as alkali metal chlorides or sulfates or alkaline earth chlorides as well as water or other solutions of other organic or inorganic materials including weak acids, tannins, alcohols, ethers, dioxan, etc. Such solutions should be such that all or at least part of the residue of the particular fatty material being treated is substantially less soluble therein than in water, and in the case of certain solutes, for example, aqueous solutions of some of the inorganic salts, the solutions may be saturated. Such solutions may also contain a wetting agent to assist in scrubbing the fatty material from the residual material. In some cases the liquid may be the fatty material being recovered if such fatty material is liquid and has a viscosity in the usable range at a usable temperature in the mill. That is to say, liquid fatty material such as cottonseed oil may be separated from the residual material by such steps as decantation, centrifugal separation or filtration and returned in relatively large quantities to the mill so that a recirculation is set up with part of the liquid fatty material being continuously withdrawn from the process and another part being continuously returned to the mill.

The volume of liquid introduced into the mill will range between approximately 3 and 30 times that of the raw material simultaneously fed into the mill and will usually range between 5 and 10 times that amount.

The mixture discharged from the mill may be separated into a liquid material in which the fatty material is in solution or suspension and a solid residual material. This separation may be accomplished by decantation, centrifugal separation in a basket-type centrifugal separator, or filtration. In most cases, if a suitable liquid is selected, separation by decantation or centrifugal separation is effective and the residue can be washed and dried. In case the fatty material is insoluble in the liquid so as to be suspended in the liquid, the double centrifugal separation of my copending application Serial No. 336,888, filed February 13, 1953, can usually be employed. Thus a "loaded" water such as a saturated solution of sodium sulfate in which the fatty material is insoluble and the residue of the particular raw material being treated is less soluble than in water may in certain cases be employed with advantage with the two-stage centrifugal separation operation just referred to. The solid residual material is separated in the first centrifugal separation at low centrifugal force from a liquid mixture containing the fatty material in suspension. Such residual material can be washed and dried. The separated liquid mixture may be again separated at high centrifugal force to recover the fatty material from the "loaded" water.

Where the fatty material is soluble in the liquid, for example, where an organic solvent for the fatty material is employed as the liquid in the mill, the last traces of the solvent can be removed from the residue by conventional solvent recovery steps such as by steaming under vacuum, and the solvent can be recovered from the fatty material, for example, by flash evaporation followed by steam stripping under vacuum. Where the liquid employed is an organic solvent for the fatty material, for example, where hexane or carbon tetrachloride is employed in a process where a vegetable oil is being recovered, it is possible to refine the fatty material before evaporating all of the solvent from the oil with considerably less loss of oil during refining. That is to say, the oil solvent mixture preferably after evaporating a portion of the solvent may be subjected to treatments with aqueous alkali and, if desired, with decolorizing adsorbents, which treatments condition the oil for a solvent stripping treatment.

It will be apparent that the liquids contemplated by the present invention will only be employed where water alone proves unsatisfactory and that loss of such liquids will be prevented as far as possible by returning the separated liquid to the process and operating in a closed system where volatile solvents are used.

As a specific example of carrying out the present process, palm kernel nuts were fed into the feed inlet of a hammer mill of the type described above along with approximately 5 times their volume of carbon tetrachloride. The mill was fitted with grids haivng slots 1/64 inch in width covering the discharge opening in the lower portion of the mill casing. The discharged mixture of a solution of palm kernel oil in carbon tetrachloride and residual solids was separated by difference in specific gravity and the solids washed with fresh carbon tetrachloride which, after removal of entrained solvent by steam stripping, contained 0.5% oil. The separated liquid fraction was distilled at low temperature under vacuum to remove the carbon tetrachloride to produce a pale oil of very high quality. The residual oil content of the meal was about 1.1%. In this particular example the mill was run at a tip speed for the hammers of about 7,000 feet per minute and the palm kernel nuts were fed in at a rate of about 16 pounds per hour.

Under similar conditions but using trichloroethylene instead of carbon tetrachloride with palm kernel nuts, the residual oil content of the meal was about 0.4%. When the same material and the same liquid were employed but with the grid slots open to 1/32" in width, the residual oil content of the meal was about 2.6%.

Palm kernel nuts fed through the hammer mill with a 50-50 mixture of trichloroethylene and palm kernel oil and a 1/64" width of grid slots yielded a meal with a residual oil content of about 1%.

Where isopropyl alcohol was used as the liquid and with the width of grid slots set at 1/64", the oil content of the palm kernel meal was about 5.6% and the oil was dark colored.

Upon using hexane as the liquid and with grid slot widths of 1/64", the residual oil content of the palm kernel meal was about 0.9%.

With dioxan as the liquid and 1/64" width of grid slots the residual oil content of the palm kernel meal was about 1.4%. The oil in this instance was very dark colored.

Palm kernel nuts run through the mill with benzene and 1/64" width of grid slots gave a residual oil content in the meal of about 1%; and palm kernel nuts with 1/64" width of grid slots and the liquid consisting of petroleum ether having a boiling point range from 40° to 60° C. resulted in a meal having a residual oil content of about 1.1%.

In all of the foregoing examples as well as those set forth below, the conditions except for the material processed, the liquid and the width of the grid slots were the same as given for the first example.

Cotton seeds with trichloroethylene and 1/64" grid slot widths resulted in a meal having a residual oil content of about 0.8%. The same material and liquid with grid slot widths of 1/32" yielded a meal with a residual oil content of about 1½%.

Cotton seed using carbon tetrachloride as the liquid and 1/64" width grid slots yielded a meal having a residual oil content of about 0.8%. Carbon tetrachloride and 1/32" width grid slots yielded a cotton seed meal having a residual oil content of about 2.8%.

Where the liquid was cotton seed oil only and the width of the grid slots 1/64" the residual oil content of the ensuing cotton seed meal was about 3.5%. The meal subsequently was solvent-washed to different lower oil contents.

With isopropyl alcohol and a width of grid slot of 1/32" the residual oil content of cotton seed meal was about 3%. In this instance the cotton seed oil obtained was extremely pale compared even to the favorable light color secured when using carbon tetrachloride as the liquid.

When the process was practiced on copra with carbon tetrachloride and employing grid slot widths of 1/16" the residual oil content of the resultant meal was about 0.9%. The same liquid and grid slot of 1/32" width yielded meal with a residual oil content of about 1½%. The process practiced on copra with methyl ether and grid slot widths of 1/32" resulted in a meal having a residual oil content of 1.3%.

With soyabeans and carbon tetrachloride, utilizing grid slot widths of 1/64", the residual oil content of the meal was about 0.8%.

Cocoa bean with carbon tetrachloride as the liquid and 1/64" grid slots yielded a meal having a residual oil content of about 1.9%. With the same liquid and 1/32" grid slot widths the residual oil content of the cocoa bean meal was about 4.3%; and upon increasing the grid slot width to 1/16" with the same liquid the residual oil content of the cocoa bean meal rose to about 7.1%. It may be observed that under certain circumstances it is commercially desirable to include an appreciable percentage of oil in the meal made from cocoa beans.

Treatment of peanuts using trichloroethylene with a grid slot width of 1/64" gave a meal having a residual oil content of about 0.8%. The oil, however, was quite dark—much darker than that resulting from treatment of peanuts with carbon tetrachloride which with a grid slot width of 1/64" yielded a meal having a residual oil content of about 0.7%. Treatment of the peanuts in hexane, utilizing a grid slot width of 1/32", resulted in a meal having a residual oil content of about 2%. Treatment of peanuts with methyl ether yielded a meal having a residual oil content of about 1.3%.

Castor seed with carbon tetrachloride as the liquid and 1/32" grid slot yielded a meal having a residual oil content of about 0.6%.

With linseed and trichloroethylene employing grid slot widths of 1/64" the residual oil content of the meal was about 4.9%.

It may be mentioned that in all runs with the various materials trichloroethylene yielded an oil which was darker colored than that recovered when employing carbon tetrachloride or simple hydrocarbon solvents.

I claim:

1. The process of recovering fatty material from fatty-material-containing raw material, a substantial portion of the residue of which after removal of the fatty material therefrom is at least colloidally soluble in water so as to produce a difficultly separable mixture when pieces of said raw material are subjected to intense impacts in the presence of water, said process comprising, subjecting pieces of said raw material to said intense impacts while surrounded by an organic solvent inert to said material in an amount several times the amount of said raw material and in which at least some of said raw material is substantially less soluble than in water so as to produce a resulting mixture in which fatty material is removed from said pieces to leave residues of said pieces which are readily separable from said resulting mixture, and separating said residues of said pieces from said resulting mixture to leave said solvent containing the removed fatty material.

2. The process of recovering fatty material from fatty-material-containing raw material, a substantial portion of the residue of which after removal of the fatty material therefrom is at least colloidally soluble in water so as to produce a difficultly separable mixture when pieces of said raw material are subjected to intense impacts in the presence of water, said process comprising, subjecting pieces of said raw material to said intense impacts while surrounded by an organic solvent inert to said material in an amount several times the amount of said raw material and in which at least some of said raw material is substantially less soluble than in water so as to produce a resulting mixture in which fatty material is removed from said pieces to leave residues of said pieces which are readily separable from said resulting mixture, separating said residues of said pieces from said resulting mixture to leave said solvent containing the removed fatty material and recovering said removed fatty material from said solvent.

3. The process as defined in claim 2 in which the fatty material is soluble in the organic solvent and said residues of said pieces are substantially insoluble therein.

4. The process as defined in claim 3, in which the organic solvent is a hydrocarbon.

5. The process as defined in claim 3, in which the organic solvent is hexane.

6. The process as defined in claim 3, in which the organic solvent is a halogenated hydrocarbon.

7. The process as defined in claim 3, in which the organic solvent is carbon tetrachloride.

8. The process of recovering fatty material from fatty-material-containing raw material, said process comprising, subjecting pieces of said raw material to intense impacts in a hammer mill while said pieces are surrounded by an organic solvent in an amount which is several times the volume of said pieces and in which solvent said fatty material is soluble and the residues of said pieces substantially insoluble so as to produce a mixture in which the fatty material is substantially all removed from said residues and is in solution in said solvent and said residues are in suspension in the solution of said fatty material in said solvent, separating the residues from said solution and recovering the fatty material from said solution.

9. The process as defined in claim 8, in which the solvent is volatile and the fatty material is recovered from said solution by evaporation of said liquid.

10. The process as defined in claim 9, in which the raw material is a vegetable seed, the fatty material being recovered is a tri-glyceride oil and the solvent is a hydrocarbon.

11. The process as defined in claim 10, in which the raw material is a vegetable seed, the fatty material being recovered is a tri-glyceride oil and the solvent is carbon tetrachloride.

12. The process of treating fatty-material-containing raw material, a substantial portion of the residue of which after removal of the fatty material therefrom is at least colloidally soluble in water when pieces of said raw material are subjected to intense impacts in the presence of water, said process comprising, subjecting pieces of said raw material to said intense impacts while surrounded by an organic solvent inert to said material in an amount several times the amount of said raw material and in which at least some of said raw material is substantially less soluble than in water so as to produce a resulting mixture in which fatty material is removed from said pieces to leave residues of said pieces which are readily separable from said resulting mixture, and separating said residues of said pieces from said resulting mixture to leave said solvent containing the removed fatty material.

13. The process of treating fatty-material-containing raw material, a substantial portion of the residue of which after removal of the fatty material therefrom is at least colloidally soluble in water when pieces of said raw material are subjected to intense impacts in the presence of water, said process comprising, subjecting pieces of said raw material to said intense impacts while surrounded by an organic solvent inert to said material in an amount several times the amount of said raw material and in which at least some of said raw material is substantially less soluble than in water so as to produce a resulting mixture in which fatty material is removed from said pieces to leave residues of said pieces which are readily separable from said resulting mixture, separating said residues of said pieces from said resulting mixture to leave said solvent containing the removed fatty material and separating said removed fatty material from said solvent.

14. The process of recovering liquid fatty material from fatty material-containing raw material, a substantial portion of the residue of which after removal of the fatty material therefrom is at least colloidally soluble in water so as to produce a difficultly separable mixture when pieces of said raw material are subjected to intense impacts in the presence of water, said process comprising subjecting pieces of said raw material to said intense impacts while surrounded by a liquid which is the same as the liquid fatty material in an amount several times the amount of said raw material so as to produce a resulting mixture in which fatty material is removed from said pieces to leave residues of said pieces which are readily separable from said resulting mixture, and separating said residues of said pieces from said resulting mixture to leave said liquid fatty material containing the removed liquid fatty material.

References Cited in the file of this patent

UNITED STATES PATENTS

| | | |
|---|---|---|
| 2,158,427 | Reichert | May 16, 1939 |
| 2,503,205 | Leaders | Apr. 4, 1950 |
| 2,579,526 | Vix et al. | Dec. 25, 1951 |
| 2,635,104 | Chayen | Apr. 4, 1953 |

FOREIGN PATENTS

| | | |
|---|---|---|
| 628,073 | Great Britain | Aug. 22, 1949 |